Aug. 1, 1933.   A. PAGE, JR   1,920,950
BRACKET FOR BELT PULLEYS
Filed March 1, 1930
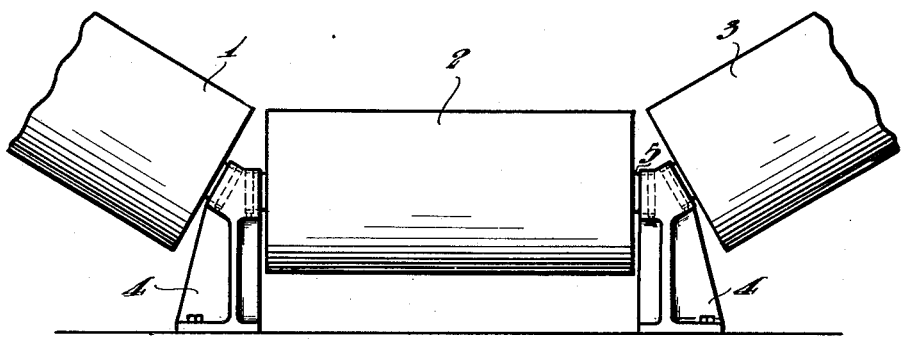
Fig. 1
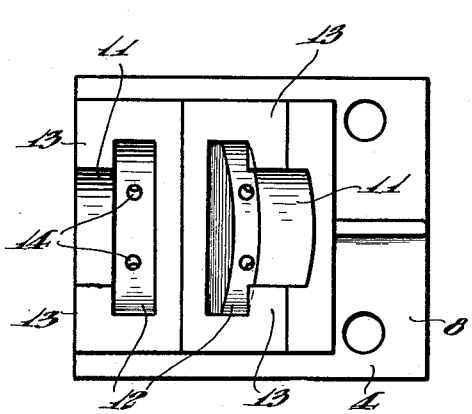
Fig. 3
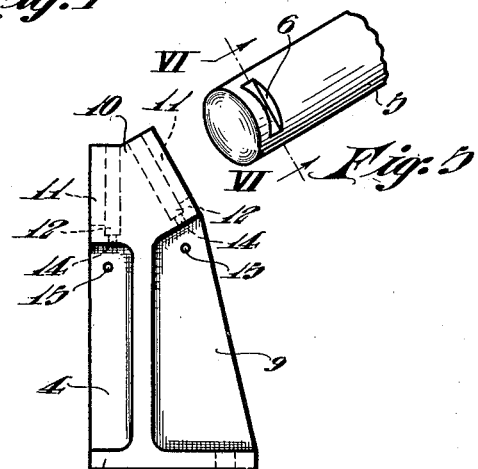
Fig. 5
Fig. 2
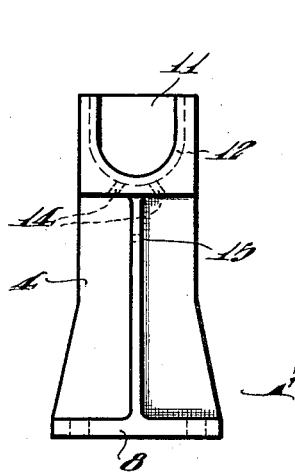
Fig. 4
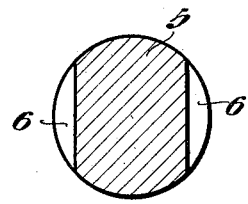
Fig. 6
INVENTOR.
Alwin Page, Jr.
BY Jesse R. Langley
ATTORNEY.

Patented Aug. 1, 1933

1,920,950

UNITED STATES PATENT OFFICE 1,920,950

BRACKET FOR BELT PULLEYS

Alwin Page, Jr., Bellevue, Pa., assignor to The Koppers Company of Delaware, a Corporation of Delaware Application March 1, 1930. Serial No. 432,324

3 Claims. (Cl. 308—20)

My invention relates to supporting devices for belt pulleys and particularly to brackets for supporting troughing idlers for conveyor belts.

An object of my invention is to provide a simple bracket of rigid construction for supporting the ends of shafts of belt pulleys.

A further object of my invention is to provide a bracket for belt pulleys that is so constructed that the shafts may be easily inserted therein and removed therefrom and which operates to prevent rotation of the shafts and to prevent endwise movements of the latter.

In accordance with the present invention, I provide a bracket having slots that are arranged to receive the ends of adjacent shafts that are at an angle to each other. The shafts are notched and the recesses are provided with projections for extending into the slots to prevent rotative and endwise movements of the shafts while they are in position.

The details of my invention will be described in connection with the accompanying drawing, in which Figure 1 is a view in side elevation of a portion of a set of troughing idlers and intermediate supporting means therefor;

Fig. 2 is an enlarged view, in side elevation, of one of the supporting brackets;

Fig. 3 is a still further enlarged top plan view of the bracket of Fig. 2;

Fig. 4 is a view in elevation, taken at right angles to Fig. 2;

Fig. 5 is a perspective view of the end portion of a pulley shaft; and

Fig. 6 is an enlarged view in transverse section of the shaft taken on line VI—VI of Fig. 5.

The intermediate portions of conveyor belts are usually supported by mechanisms known as troughing idlers, a portion of a set of which is illustrated in Fig. 1. The idler pulleys 1, 2 and 3 are mounted at angles to each other and are supported in brackets 4 that are adapted to receive the ends of the shafts at the desired angles. The outer supporting brackets for the pulleys 1 and 3 have been omitted as unnecessary to an understanding of the present invention, as they may be in general similar to the brackets 4 or of any desired or usual construction.

Each of the pulleys is provided with a shaft 5 upon which it is rotatably mounted, an enlarged portion of a shaft being shown in Fig. 5. Each shaft has segmental notches 6 on opposite sides and adjacent the ends thereof, to produce a reduced section, as shown in Fig. 6.

The brackets 4 comprise a base portion 8, an upright portion or standard 9 and a top portion or block 10, within which is located suitable recesses 11 for receiving the ends of the shafts 5. Each of the recesses 11 comprises an inner enlarged portion or groove 12 that is of such width as to receive the end portion of the shaft which has not been reduced by the notches 6. The outer side of each recess 11 is provided with two inwardly projecting parallel flanges 13, that are adapted to extend into the segmental notches 6 to retain the shafts in position against endwise movement and also to prevent rotation of the shaft. The grooves 12 are provided with drain holes 14 to prevent the accumulation of oil or dirt in the recesses 11.

The pulleys are placed in position with respect to the brackets 4 by adjusting the corresponding shaft 5 to such position that the segmental notches 6 are in alignment with the inwardly projecting flanges 13 and then moving the pulley and its shaft downwardly until the shaft is seated in the corresponding notches 11 with the flanges 13 adjacent to the bottom portions of the notches 6.

The pulleys then remain in position by reason of their own weight and the weight of the belt which they support. The flanges 13 effectively coact with the reduced section of the shafts to prevent rotation and also to prevent endwise movement of the shafts, as will be readily understood.

For convenience in shipping, each bracket 4 is provided with a hole 15 through each of two web portions and through which holes a wire or other fastening device may be secured to prevent the shafts 5 from shifting out of the recesses 11.

My improved construction provides a simple and efficient arrangement whereby the pulleys may be easily and conveniently placed in position upon the supporting brackets or may be removed therefrom. The brackets may be made in a single casting and it is a relatively simple matter to provide the shafts with notches.

The foregoing and other advantages will be apparent to those skilled in the art relating to devices of the same general character.

I claim as my invention:

1. Belt-supporting means comprising a plurality of pulleys adapted to operate with their axes at an angle, said pulleys having shafts upon which they are rotatably mounted, adjacent end portions of said shafts having oppositely disposed parallel slots, and a supporting bracket for said adjacent end portions of said shafts and having a substantially solid upper portion with separate recessed portions for receiving the respective extreme end portions of said shafts and having parallel portions for projecting into said slots to prevent rotation of said shafts and to prevent endwise movements of the latter.

2. A bracket for supporting belt pulleys comprising a standard having a recess in its upper end that is adapted to receive the end of a shaft, said recess having an inner relatively enlarged portion for receiving the extreme end portion of said shaft and an outer relatively restricted portion for coacting with a reduced portion of the shaft to be received by said recess, the shaft portions corresponding in relative size to the recess portions.

3. A bracket for supporting belt pulleys comprising a standard having recesses extending at an angle to each other and adapted to receive ends of shafts extending at right angles to the respective recesses, each of said recesses having a relatively restricted outer portion and a relatively enlarged portion for coacting with corresponding portions of the shafts to be received to restrain certain movements of the latter.

ALWIN PAGE, JR.